Dec. 13, 1966 S. GELLMAN 3,291,180
CLAMP-TYPE TRACTION DEVICE
Filed March 14, 1966 2 Sheets-Sheet 1
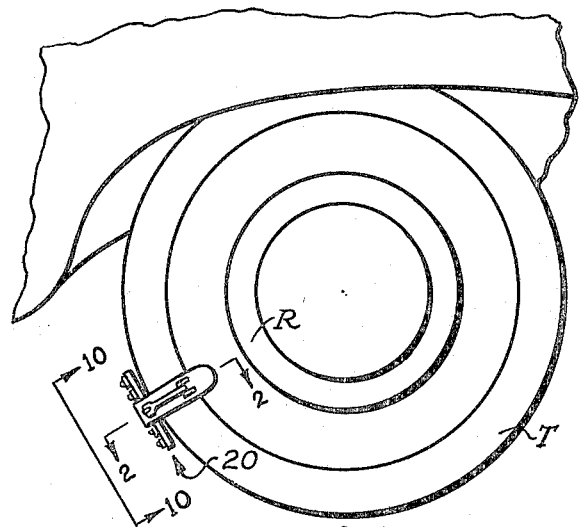
FIG. 1
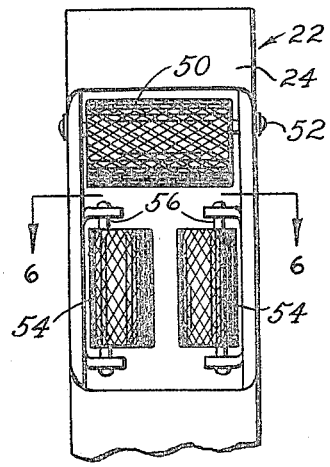
FIG. 5
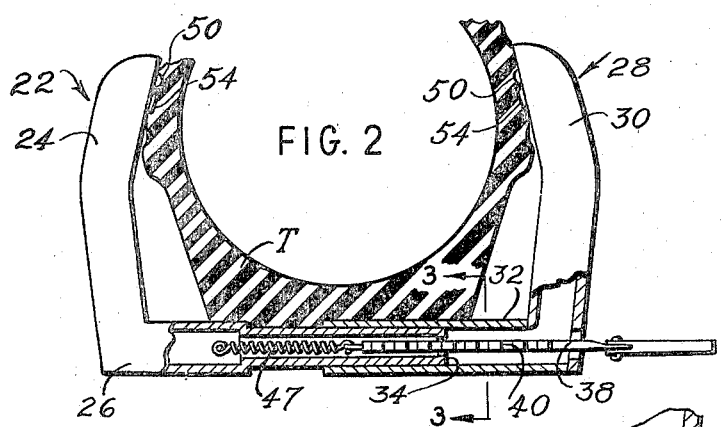
FIG. 2
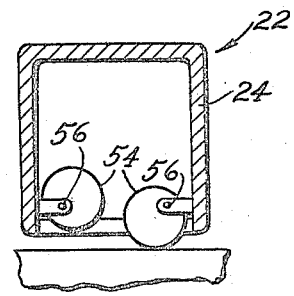
FIG. 6
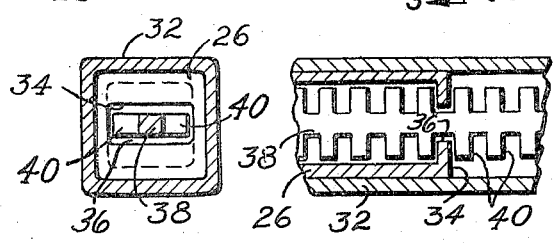
FIG. 3   FIG. 4
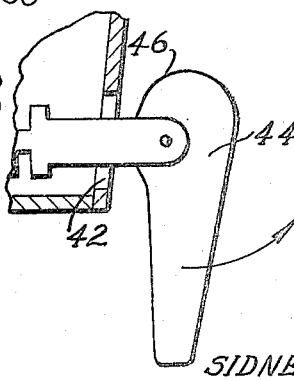
INVENTOR.
SIDNEY GELLMAN
BY Leonard H. King
ATTORNEY

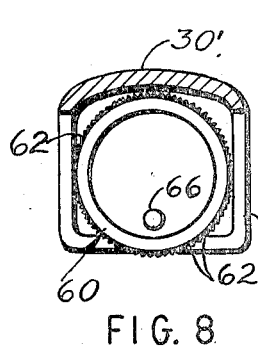
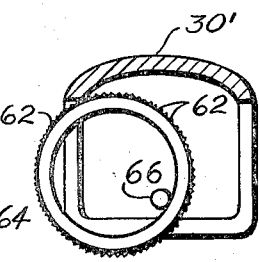
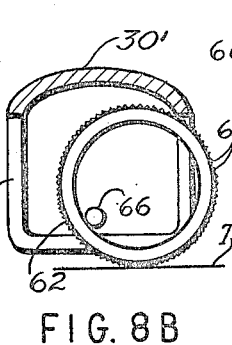
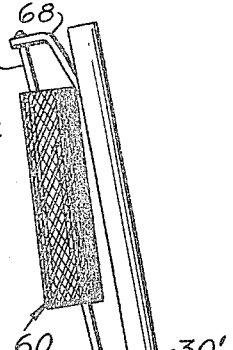
FIG. 8　　FIG. 8A　　FIG. 8B
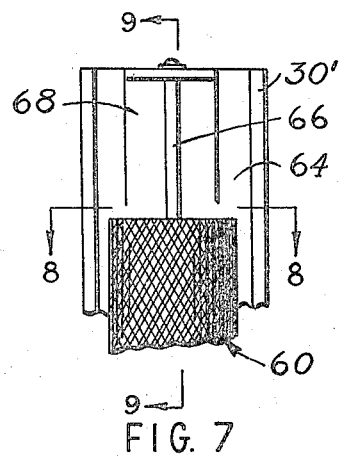
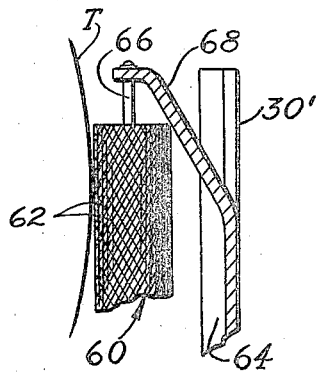
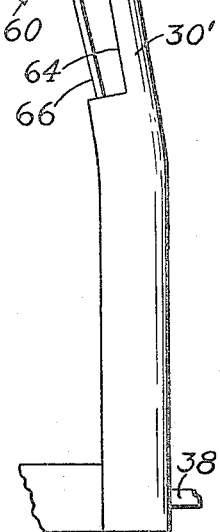
FIG. 7　　FIG. 9A　　FIG. 9
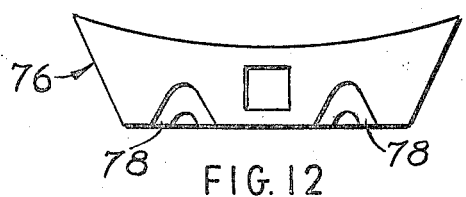
FIG. 12
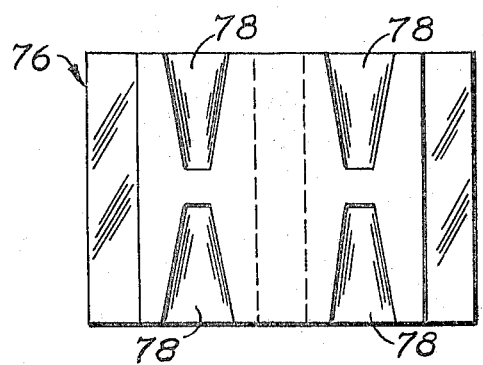
FIG. 11
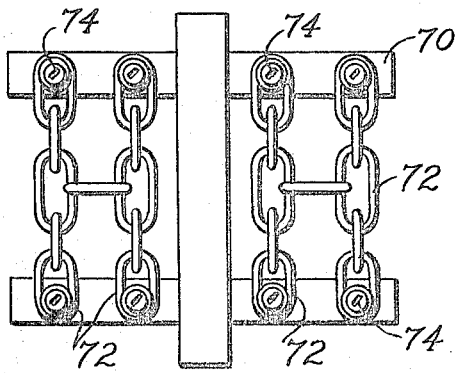
FIG. 10
INVENTOR.
SIDNEY GELLMAN
BY Leonard H. King
ATTORNEY

United States Patent Office 3,291,180
Patented Dec. 13, 1966

3,291,180
CLAMP-TYPE TRACTION DEVICE
Sidney Gellman, 86 Farrell St., Long Beach, N.Y.
Filed Mar. 14, 1966, Ser. No. 534,085
10 Claims. (Cl. 152—225)

This application is a continuation-in-part of my copending application, Serial No. 426,591 filed January 19, 1965, now U.S. Patent No. 3,245,451 granted on April 12, 1966.

This invention relates generally to clamp-type traction devices and more particularly to improved means for clamping the traction device to pneumatic tires. The present invention also teaches improved traction means in combination with the clamping means.

My aforementioned U.S. patent discloses a device that may be easily attached to the tires of an automotive vehicle whereby the vehicle may move in slush, snow, or mud. Basically, the device described in my patent is U-shaped with the upright legs being placed against the inner and outer side walls of the tire proximate the rim therefor. The cross member of the device is placed transversely of the tire tread. The U-shaped device is in two parts defined by a telescoping transverse leg in order to permit the space between the upright legs to be made approximately the width between the tire walls. The traction device is securely clamped to the tire by an over centering toggle arrangement. A spring is included to urge the two parts together.

While my patented structure was perfectly acceptable, there were several areas that could be improved to provide easier assembly and more positive gripping of the tire. In place of the long screw used in the past to join the telescoping portions of the clamp, I now propose an axially shorter, ¼ turn fastener that includes cam-type locking means. This feature eliminates the need for excessive threading, thus permitting much faster mounting of the device on the tire. This feature also eliminates the possibility of overtightening the screw in my patent and thereby reduces the likelihood of damaging the seal between the tire and rim of a tubeless tire. A spring urges the two main elements together.

Further, I now propose to use camming means that will positively lock the device on the tire side walls at a point where the tires bulge. The camming means prevent movement in both radial and angular directions with respect to the tire axis. Two different embodiments will be described for providing the improved gripping action. In the first embodiment, several cams are provided on each upright leg of the U-shaped traction device. One cam on each leg prevents radial movement of the device. Two cams on each leg prevents angular movement of the traction device on both of two opposite directions. In an alternative embodiment, a single three-way acting cam is used on each leg.

Finally, two additional tread devices will be disclosed in this invention. In one embodiment, a heavy link chain is mounted on a frame that is secured to the traction device. In another embodiment, a large, molded member having a planar surface and a number of different self-cleaning grooves is secured to the underside of the traction device. Either of the two tread devices just mentioned provides improved road surface gripping characteristics over that disclosed in my issued patent and, in combination with the new clamping means, provides an improved traction device.

Accordingly, it is an object of this invention to provide a clamp-type traction device having improved locking means for two relatively movable parts.

Another object is to provide locking means as mentioned above wherein said locking means requires only a quarter turn between the locked and unlocked positions.

A further object is to provide improved means for gripping the side walls of the tire.

A particular object is to provide means for preventing slippage of the traction device relative to the tire axis.

Yet another object is to provide means for preventing radial and angular slippage of the traction device relative to the tire axis.

A feature of this inveniton is the use of a single cam roller on each vertical leg of the traction device, said cam rollers acting to prevent radial and angular movement of the traction device with respect to the tire.

Another feature of the invention is the inclusion of improved tread means that may be used in combination with the traction device.

An object of this invention is to incorporate a tread comprised of a link chain with a clampable traction device.

A further object of this invention is to incorporate a tread comprised of a molded block having self-cleaning grooves with a clampable traction device.

An additional feature of this invention is that it is easily stored on the spare tire in the trunk compartment of an automobile.

Yet another feature is that the present invention may easily be installed on a driving wheel by standing at the side of the automobile without raising the wheel.

These and other objects, features and advantages of the invention will, in part, be pointed out with particularity and will, in part, become obvious from the following more detailed description of the invention, taken in conjunction with the accompanying drawing which forms an integral part thereof.

In the various figures of the drawing like reference characters designate like parts.

In the drawing:

FIG. 1 is a fragmentary side elevational view illustrating the improved traction device of this invention applied to a pneumatic tire;

FIG. 2 is an enlarged view, partly in section, taken along line 2—2 of FIG. 1;

FIG. 3 is a transverse sectional view illustrating the improved locikng means in the open position;

FIG. 4 is an enlarged, fragmentary side elevational view, in section, taken along line 4—4 of FIG. 3 illustrating the locking means in the locked condition;

FIG. 5 is an enlarged fragmentary side elevational view of the camming means for retaining the traction device securely on the tire;

FIG. 6 is a sectional plan view taken along line 6—6 of FIG. 5;

FIG. 7 is an enlarged fragmentary side elevational view of alternative camming means for retaining the traction device securely on the tire;

FIGS. 8, 8A and 8B are sectional plan views of the embodiment of FIG. 7 showing the camming means in different positions;

FIGS. 9 and 9A are fragmentary side elevational views of the FIG. 7 embodiment illustrating a second action of the camming means.

FIG. 10 is a bottom plan view taken along line 10—10 of FIG. 1 illustrating tread means in the form of a link chain;

FIG. 11 is a view similar to FIG. 10 illustrating alternative tread means; and

FIG. 12 is a bottom plan view of the tread embodiment of FIG. 11.

Referring now to FIG. 1 and FIG. 2, tire T supports an improved traction device 20 with contact being made therebetween in an area that is closer to the tire bulge than to the rim R of the tire. Traction device 20 is comprised of a first L-shaped member 22 having leg portions 24 and 26 and a second L-shaped member 28 having leg portions 30 and 32. The leg portions of each L-shaped member are at an angle to each other of slightly less than 90°. As may be seen in FIG. 2, leg 26 of member 22 telescopingly fits within leg 32 of member 28 to define, in combination, a generally U-shaped device. While both members are relatively movable with respect to each other, for the purposes of this description member 22 will be considered stationary and member 28 movable with respect thereto.

The improved locking means are best shown in FIG. 3 and in FIG. 4. Leg 32 is of course hollow to slidingly receive leg 26. It will be seen that leg 26 is also hollow and terminates in an inwardly formed lip 34 that defines a rectangular opening 36. A rectangularly cross sectioned rod 38 having a number of teeth 40 on only two opposed surfaces is disposed in aperture 36. When the larger dimension of the aperture and the rod cross section are parallel the rod is freely movable. When the rod is turned 90° one set of opposed teeth 40 will be engaged by the inwardly extending lip, thus preventing further axial movement of the rod which is initially inserted through an aperture 42 at the base of leg 30. Over-centering latch member 44, having a camming surface 46 arranged to bear against the outside surface of leg 30, is pivotally secured to the external end of the rod 38. A spring member 47 which is in tension is used to urge member 28 towards member 22. The spring is disposed within stationary hollow leg 26 and has one end secured thereto. The other end of the spring is secured to the internal end of rod 38.

It is evident then that the inside surfaces of the two legs 24 and 30 may quickly be brought into abutment with the side walls of the tire and by using the over-centering latch member to turn rod 38 through an angle of 90° the two L-shaped members are locked to each other. Pivoting of the latch member in the direction of the arrow will then cause leg 30 to move closer to leg 24 and securely clamp the tire therebetween.

In FIG. 5 and FIG. 6 means are illustrated for preventing movement of the traction device once it has been locked in place, as described hereinabove. Since the same structure is found in both upright legs, only one need be described. A horizontally positioned roller 50 is eccentrically mounted on a shaft 52 that is journaling leg 24. In the same manner vertically positioned rollers 54 are eccentrically mounted on parallel shafts 56 journaled in leg 24. Rollers 50 and 54 engage the tire side walls in the area of the bulge thereof. Should there be a tendency for radial movement of the traction device, eccentric roller 50 will be displaced slightly about the axis of shaft 52 to produce a wedging action between the leg and the side wall of the tire. Should there be a tendency for the traction device to move in either angular direction (clockwise or counterclockwise), one or the other of rollers 54 will be eccentrically displaced about its shaft 56 to produce the wedging action. The tire-engaging surface of rollers 50 and 54 may be knurled to increase the gripping action.

The function of the three camming members may be served by an alternative structure shown in FIGS. 7, 8 and 9. Herein the three camming members of each upright leg are replaced by a single, cylindrical cam 60 having, for example, a deep diamond knurl 62 on its outer surface. Cam member 60 is hollow and is disposed in a recess 64 formed in the leg member. The cam is loosely mounted on a shaft 66 disposed within the leg member. Member 60 may move angularly and axially with respect to shaft 66. Should there be any angular movement of the traction device with respect to the axis of the tire, the camming member will pivot eccentrically about the shaft until the knurled outer surface engages the edges of the leg member. This will provide the wedging action described in conjunction with the previous embodiment and thereby prevent additional movement of the traction device.

Each leg member 30' is provided at its uppermost end with an inwardly projecting tongue 68 that is disposed in the path of the camming member. Should there be a tendency for radial movement of the traction device with respect to the tire axis, the camming member will slide longitudinally on the shaft and will engage the inwardly bent tongue. This action causes the camming member to be deflected inwardly and wedge against the tire side wall. In these last two embodiments, as well as in the first embodiment described, the upper end of the upright legs bears against the tire side walls at a point lower than the rim thereof. Specifically, engagement is in the area where the tire bulges when under a load.

FIG. 10 illustrates an improved tread adapted for use in combination with the traction device. The open frame member 70 is secured such as by welding to the transverse horizontal leg of the traction device. Link chains 72 are strung across the frame and secured thereto by conventional fasteners 74. Where nuts and screws are used as fasteners, it is possible to easily change a link should it become broken. The link chain offers the same advantages as a full chain does in snow or mud. Increased gripping action is provided with this single traction device whereby the driver may easily get the car out of very soft terrain.

Alternative tread means is shown in FIG. 11 and FIG. 12. A block 76, for example molded of hard rubber, is secured to the underside of the transverse leg of the traction device. The block has a series of grooves 78 of varying depth. It will be noted that the bottoms of the grooves are preferably rounded as opposed to having sharp corners. so that snow or mud will not accumulate therein and thereby reduce the gripping action of the tread.

A noteworthy feature of this invention is that the traction device may easily be stored in the trunk compartment of an automobile merely by clamping the device to the spare tire. To remove the traction device from the trunk, the locking means is given a quarter turn and the two legs are pulled apart slightly against the urging of the tensioned spring. With the legs spaced apart, the locking means may be reengaged to hold this position. The traction device may now be applied to the driving tire and when this is done the locking means is again given a quarter turn to permit the spring to draw the legs together. At this time the locking means is given a final quarter turn and the cam acting latch is moved into place.

It will be apparent that the present invention can quickly be installed on a tire without having to jack up the car. The device may be installed by standing at the side of the automobile. Special tools and skills are not required. In addition, since the locking means is positive, large forces are not required to secure the device. Accordingly, even a woman may use the traction device with very little effort.

Having thus disclosed the best embodiment of the invention presently contemplated, it is to be understood that various changes and modifications may be made by those skilled in the art without departing from the spirit of the invention.

What is claimed is:

1. A traction device for use with a pneumatic tire mounted on a rim, the tire having a ground-engaging tread portion and side walls that bulge outwardly under a load, said traction device comprising:

(a) a generally U-shaped frame member having two, spaced, upright leg portions relatively movable with respect to each other and transverse sections joining said upright leg portions, said transverse portions being integral with said leg portions and in the assembled condition being disposed across the tire tread;

(b) cam-type tire gripping means eccentrically mounted in the opposed surfaces of each said leg portion, said gripping means being in engagement with the tire side walls in the assembled condition; and (c) locking means releasably joining said transverse sections to each other whereby said gripping means firmly engage the bulged side walls of the tire.

2. The device is accordance with claim 1 wherein said locking means comprises a quarter turn fastener having a first portion contained within said transverse sections and arranged to releasably engage one of said transverse sections, said fastener having a second portion extending outwardly of one of said legs and having an over-centering latch arranged to bear against said leg in the locked position.

3. The device in accordance with claim 2 wherein said first portion of said fastener is rectangular in across section and has a plurality of teeth on two opposed surfaces, a portion of said transverse section in which said fastener is contained having a lip dimensioned to slidably receive said fastener in the unlocked position and to engage said fastener teeth in the locked position.

4. The device in accordance with claim 1 including elongated spring means disposed in said transverse section, one end of said spring means being secured to one of said transverse sections, the other end of said spring means being secured to the first portion of said fastener whereby said spring means is in tension.

5. The device in accordance with claim 1 wherein said tire-gripping means comprises a plurality of rollers extending inwardly of the opposed surfaces of said leg portions, there being provided one horizontally oriented roller proximate the upper end of each said leg and a pair of vertically oriented rollers in each said leg, each pair of said vertically oriented rollers being positioned below one of said horizontal oriented rollers whereby the side wall of the tire is gripped in the bulged portion thereof.

6. The device is accordance with claim 5 wherein the tire-engaging surface of said rollers is rough textured.

7. The device in accordance with claim 1 wherein the upper end of said leg portions include a recess and an inwardly projecting tongue and wherein the tire-gripping means is comprised of a shaft rigidly secured within the leg recess and a tubular member loosely mounted on said shaft, said tubular member being angularly movable in either of two opposed directions with respect to said shaft, whereby said tubular member is wedged between an edge of the leg recess and the tire side wall and also axially movable with respect to said shaft whereby said tubular member is wedged between said tongue and the tire side wall.

8. The device in accordance with claim 7 wherein the tire-engaging surface of said tubular member is rough textured.

9. In combination with the device of claim 1, tread means comprising a frame member secured to said transverse sections and a plurality of chain links secured to said frame member, said chain links being arranged to contact the ground surface when said traction device is mounted on the tire.

10. In combination with the device of claim 1, tread means comprising a block member secured to said transverse sections and having a surface arranged to contact the ground, said ground-engaging surface of said block member including a plurality of grooves.

References Cited by the Examiner
UNITED STATES PATENTS

| | | | |
|---|---|---|---|
| 1,800,877 | 4/1931 | Vosburgh | 152—227 |
| 1,858,412 | 5/1932 | Neumann | 152—225 |

ARTHUR L. LA POINT, *Primary Examiner.*

MILTON BUCHLER, *Examiner.*

C. W. HAEFELE, *Assistant Examiner.*